US012106022B2

(12) United States Patent
Hu et al.

(10) Patent No.: US 12,106,022 B2
(45) Date of Patent: Oct. 1, 2024

(54) METHOD AND DEVICE FOR SIMULATING DYNAMIC DIGITAL TWIN MODEL OF DOMINANT OPERATION OF WIND TURBINE GENERATOR ASSEMBLY

(71) Applicant: NORTH CHINA ELECTRIC POWER UNIVERSITY, Beijing (CN)

(72) Inventors: Yang Hu, Beijing (CN); Fang Fang, Beijing (CN); Weiran Wang, Beijing (CN); Jizhen Liu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/399,584

(22) Filed: Dec. 28, 2023

(65) Prior Publication Data
US 2024/0265168 A1 Aug. 8, 2024

(30) Foreign Application Priority Data
Feb. 2, 2023 (CN) .......................... 202310120858.0

(51) Int. Cl.
*G06F 30/20* (2020.01)
*F03D 13/20* (2016.01)
*F03D 15/00* (2016.01)

(52) U.S. Cl.
CPC ........... *G06F 30/20* (2020.01); *F03D 13/201* (2023.08); *F03D 15/00* (2016.05); *F05D 2260/81* (2013.01)

(58) Field of Classification Search
CPC .......... G06F 30/20; G06F 30/25; G06F 30/27; G06F 30/28; F03D 13/201; F03D 15/00;
(Continued)

(56) References Cited

U.S. PATENT DOCUMENTS 11,725,626 B2 * 8/2023 Collet .................. F03D 7/0224
290/44
2018/0268090 A1 * 9/2018 Ren ..................... G05B 23/0297
2021/0110262 A1 4/2021 Schmitt et al.

FOREIGN PATENT DOCUMENTS

CN 102588211 * 7/2012 ............... F03D 7/00
CN 112507569 3/2021
(Continued)

OTHER PUBLICATIONS

Nejad et al. "Wind turbine drivetrains: state-of-the-art technologies and future development trends" Wind Energ. Sci., 7, 387-411, 2022; https://doi.org/10.5194/wes-7-387-2022 [retrieved on Mar. 13, 2024] (Year: 2022).*

(Continued)

*Primary Examiner* — Kamini S Shah
*Assistant Examiner* — Alfred H B Wechselberger
(74) *Attorney, Agent, or Firm* — Haynes and Boone, LLP

(57) ABSTRACT

The present disclosure provides a method and device for simulating a dynamic digital twin model of dominant operation of a wind turbine generator assembly, by which conventional operational parameters of the wind turbine generator assembly that are acquired in real time are preprocessed to obtain steady-state operational parameters of the wind turbine generator assembly. A pneumatic subsystem-related data black box model, a transmission subsystem model, a tower subsystem model, and an electrical subsystem model are simulated individually using the steady-state operational parameters, and then combined to form a dynamic dominant-operation simulation model for simulating an operation process of the wind turbine generator assembly. Meanwhile, a dynamic deviation compensation model is constructed on the basis of the dynamic dominant-operation simulation model.

9 Claims, 6 Drawing Sheets

(58) Field of Classification Search
CPC .......... F03D 13/20; F03D 80/00; F03D 15/10; F03D 15/101; F03D 15/201; F03D 15/202; F03D 15/205; F03D 15/207; F05D 2260/81; F05B 2240/912
See application file for complete search history.

(56) References Cited

FOREIGN PATENT DOCUMENTS

| CN | 112765748 | | 5/2021 | | |
|---|---|---|---|---|---|
| CN | 112784496 | | 5/2021 | | |
| CN | 113236491 | | 8/2021 | | |
| CN | 114198266 | | 3/2022 | | |
| CN | 114281029 | | 4/2022 | | |
| CN | 115164378 | | 10/2022 | | |
| CN | 115498660 | | 12/2022 | | |
| EP | 3343300 | * | 4/2018 | ............. | G05B 13/02 |
| WO | WO2020069070 | * | 4/2020 | ............. | F03D 13/10 |

OTHER PUBLICATIONS

Koerber et al. "Combined Feedback-Feedforward Control of Wind Turbines Using State-Constrained Model Predictive Control" IEEE Transactions on Control Systems Technology, vol. 21, No. 4, Jul. 2013 [retrieved on Mar. 13, 2024] (Year: 2013).*

Mahmoud et al. "Adaptive and Predictive Control Strategies for Wind Turbine Systems: A Survey" IEEE/CAA Journal of Automatica Sinica, vol. 6, No. 2, Mar. 2019 [retrieved on Mar. 13, 2024] (Year: 2019).*

Mandic et al. "Active Torque Control for Gearbox Load Reduction in a Variable-Speed Wind Turbine" IEEE Transactions on Industry Applications, vol. 48, No. 6, Nov./Dec. 2012 [retrieved on Mar. 12, 2024] (Year: 2012).*

Fang, Fang et al. "Wind turbine digital twin system," 2021, 26 pages [online] Retrieved from the Internet <URL: https://kns.cnkl.net/kcms/detail/11.5844.TH.20211011.1101.002.html>.

* cited by examiner

METHOD AND DEVICE FOR SIMULATING DYNAMIC DIGITAL TWIN MODEL OF DOMINANT OPERATION OF WIND TURBINE GENERATOR ASSEMBLY

CROSS-REFERENCE TO RELATED APPLICATIONS

The present application claims priority to Chinese patent application No. 2023101208580, entitled "Method and Device for Simulating Dynamic Digital Twin Model of Dominant Operation of Wind Turbine Generator Assembly", filed to the Chinese Patent Office on Feb. 2, 2023, the entire content of which is incorporated herein by reference.

TECHNICAL FIELD

The present disclosure relates to the field of data processing technologies, and in particular to a method and device for simulating a dynamic digital twin model of dominant operation of a wind turbine generator assembly.

BACKGROUND ART

Vigorously developing wind power generation is one of the important tasks of energy transformation and energy structure adjustment. In order to improve the grid-friendliness of large-scale wind power generation, modern wind turbine generator assemblies are required to have the capability of being flexibly adjustable in response to maximum power and limited power dispatching instructions. Therefore, fine control and monitoring of operational parameters involved in the wind turbine generator assemblies have attracted more and more attention.

Currently, dynamic simulation methods related to wind turbine generator assemblies can achieve high-precision representation of the operating states of the key systems of the assemblies depending only on the input-output characteristics, but the accuracy of models is limited by the amount of training data and uniformity thereof under multiple working statuses, thus the global adaptability of the models can hardly be guaranteed, and the models are poorly interpretable. Therefore, how to construct a high-precision dynamic dominant-operation simulation model for simulating an operation process of a wind turbine generator assembly has become an urgent problem to be solved.

SUMMARY

In view of this, the present disclosure aims at providing a method and device for simulating a dynamic digital twin model of dominant operation of a wind turbine generator assembly, by which a dynamic dominant-operation simulation model for simulating the wind turbine generator assembly can be established, so that the simulation of the operation of the wind turbine generator assembly can be achieved with the highest reproducibility, which helps to improve the accuracy of the simulation results.

An embodiment of the present disclosure provides a method for simulating a dynamic digital twin model of dominant operation of a wind turbine generator assembly. The simulation method comprises:

preprocessing conventional operational parameters of the wind turbine generator assembly that are acquired in real time, and extracting steady-state operational parameters from the conventional operational parameters, wherein the conventional operational parameters are parameters acquired during real-time operation of the wind turbine generator assembly;

separating the steady-state operational parameters of the wind turbine generator assembly under all working statuses in accordance with a preset working status dividing condition, and determining a plurality of operational working domains involved in the operational parameters of the wind turbine generator assembly at a plurality of operational time points under different task working statuses, wherein the all working statuses include at least a normal power generation status and a power restriction and wind power curtailment status;

establishing a pneumatic subsystem-related data black box model by using the steady-state operational parameters of the wind turbine generator assembly at each operational time point included in each operational working domain, wherein the pneumatic subsystem-related data black box model is used for determining a mechanical torque of a wind turbine during working of the wind turbine generator assembly in each operational working domain;

establishing a transmission subsystem model by mechanical dynamics of the wind turbine generator assembly reflected, by using the mechanical torque of the wind turbine during working of the wind turbine generator assembly in each operational working domain and hardware structural parameters of the wind turbine generator assembly in combination with a lumped parametric mechanistic model, wherein the transmission subsystem model is used for determining a torque of an intermediate shaft of a gearbox during working of the wind turbine generator assembly in each operational working domain, and the mechanical dynamics are used for reflecting an operating state of each hardware facility of the wind turbine generator assembly;

establishing a tower subsystem model by mechanical dynamics of the wind turbine generator assembly reflected, by using tower mass, a damping coefficient, and a stiffness matrix of a tower assembly of the wind turbine generator assembly as well as an axial thrust applied to a tower top of the tower assembly in combination with a lumped parametric mechanistic model, wherein the tower subsystem model is used for determining a vibrational acceleration of the tower top of the tower assembly;

establishing an electrical subsystem model by using the steady-state operational parameters of the wind turbine generator assembly, an electromagnetic torque reference value, and an equivalent time constant in combination with a data black box model, wherein the electrical subsystem model is used for determining a rate of change in electromagnetic torque of a generator during working of the wind turbine generator assembly;

integrating the pneumatic subsystem-related data black box model, the transmission subsystem model, the tower subsystem model, and the electrical subsystem model, and performing a combined identification of model parameters by using a system identification algorithm to obtain a dynamic dominant-operation simulation model for the wind turbine generator assembly, wherein the dynamic dominant-operation simulation model is used for simulating an operation process of the wind turbine generator assembly;

constructing a dynamic deviation compensation model on the basis of the dynamic dominant-operation simulation model by using the steady-state operational parameters of the wind turbine generator assembly in combination with a machine learning algorithm, wherein the dynamic deviation compensation model is used for determining a state deviation compensation term and an output deviation compensation term, the state deviation compensation term is used for compensating for operational parameters during operation of the dynamic dominant-operation simulation model, and the output deviation compensation term is used for compensating for loaded operational parameters outputted from the dynamic dominant-operation simulation model; and integrating the dynamic dominant-operation simulation model and the dynamic deviation compensation model to establish a digital twin model for the wind turbine generator assembly.

An embodiment of the present disclosure further provides a system for simulating a dynamic digital twin model of dominant operation of a wind turbine generator assembly. The simulation system comprises:

deploying a digital twin model for a wind turbine generator assembly in software and hardware tools by reference to an operation control strategy for the wind turbine generator assembly to achieve an emulation of an operation process of the wind turbine generator assembly, wherein the digital twin model is obtained by the simulation method as described above.

An embodiment of the present disclosure further provides a device for simulating a dynamic digital twin model of dominant operation of a wind turbine generator assembly. The simulation device comprises:

a parameter preprocessing module configured to preprocess conventional operational parameters of the wind turbine generator assembly that are acquired in real time, and extract steady-state operational parameters from the conventional operational parameters, wherein the conventional operational parameters are parameters acquired during real-time operation of the wind turbine generator assembly;

a working domain determination module configured to separate the steady-state operational parameters of the wind turbine generator assembly under all working statuses in accordance with a preset working status dividing condition, and determine a plurality of operational working domains involved in the operational parameters of the wind turbine generator assembly at a plurality of operational time points under different task working statuses, wherein the all working statuses include at least a normal power generation status and a power restriction and wind power curtailment status;

a first submodel establishment module configured to establish a pneumatic subsystem-related data black box model by using the steady-state operational parameters of the wind turbine generator assembly at each operational time point included in each operational working domain, wherein the pneumatic subsystem-related data black box model is used for determining a mechanical torque of a wind turbine during working of the wind turbine generator assembly in each operational working domain;

a second submodel establishment module configured to establish a transmission subsystem model by mechanical dynamics of the wind turbine generator assembly reflected, by using the mechanical torque of the wind turbine during working of the wind turbine generator assembly in each operational working domain and hardware structural parameters of the wind turbine generator assembly in combination with a lumped parametric mechanistic model, wherein the transmission subsystem model is used for determining a torque of an intermediate shaft of a gearbox during working of the wind turbine generator assembly in each operational working domain, and the mechanical dynamics are used for reflecting an operating state of each hardware facility of the wind turbine generator assembly;

a third submodel establishment module configured to establish a tower subsystem model by mechanical dynamics of the wind turbine generator assembly reflected, by using tower mass, a damping coefficient, and a stiffness matrix of a tower assembly of the wind turbine generator assembly as well as an axial thrust applied to a tower top of the tower assembly in combination with a lumped parametric mechanistic model, wherein the tower subsystem model is used for determining a vibrational acceleration of the tower top of the tower assembly;

a fourth submodel establishment module configured to establish an electrical subsystem model by using the steady-state operational parameters of the wind turbine generator assembly, an electromagnetic torque reference value, and an equivalent time constant in combination with a data black box model, wherein the electrical subsystem model is used for determining a rate of change in electromagnetic torque of a generator during working of the wind turbine generator assembly;

a first model integration module configured to integrate the pneumatic subsystem-related data black box model, the transmission subsystem model, the tower subsystem model, and the electrical subsystem model, and performing a combined identification of model parameters by using a system identification algorithm to obtain a dynamic dominant-operation simulation model for the wind turbine generator assembly, wherein the dynamic dominant-operation simulation model is used for simulating an operation process of the wind turbine generator assembly;

a fifth submodel establishment module configured to construct a dynamic deviation compensation model on the basis of the dynamic dominant-operation simulation model by using the steady-state operational parameters of the wind turbine generator assembly in combination with a machine learning algorithm, wherein the dynamic deviation compensation model is used for determining a state deviation compensation term and an output deviation compensation term, the state deviation compensation term is used for compensating for operational parameters during operation of the dynamic dominant-operation simulation model, and the output deviation compensation term is used for compensating for loaded operational parameters outputted from the dynamic dominant-operation simulation model; and a second model integration module configured to integrate the dynamic dominant-operation simulation model and the dynamic deviation compensation model to establish a digital twin model for the wind turbine generator assembly.

An embodiment of the present disclosure further provides an electronic apparatus comprising: a processor, a memory, and a bus, wherein the memory stores a machine-readable instruction executable by the processor, the processor communicates with the memory through the bus when the electronic apparatus is in operation, and the steps of the method for simulating a dynamic digital twin model of dominant operation of a wind turbine generator assembly as described above are executed when the machine-readable instruction is executed by the processor.

An embodiment of the present disclosure further provides a computer-readable storage medium, wherein a computer program is stored on the computer-readable storage medium, and the steps of the method for simulating a dynamic digital twin model of dominant operation of a wind turbine generator assembly as described above are executed when the computer program is run by a processor.

In the method and device for simulating a dynamic digital twin model of dominant operation of a wind turbine generator assembly according to the embodiments of the present disclosure, conventional operational parameters of the wind turbine generator assembly that are acquired in real time are preprocessed to obtain steady-state operational parameters of the wind turbine generator assembly, considering that the collected conventional operational parameters contain abnormal and unstable operational parameters because the wind turbine generator assembly is susceptible to interference or influence from various random uncertain events such as the external environment, signal measurement and transmission, etc. A pneumatic subsystem-related data black box model, a transmission subsystem model, a tower subsystem model, and an electrical subsystem model are simulated individually using the steady-state operational parameters, and then combined to form a dynamic dominant-operation simulation model for simulating an operation process of the wind turbine generator assembly. Meanwhile, a dynamic deviation compensation model is constructed on the basis of the dynamic dominant-operation simulation model to achieve compensation for operational parameters and loaded operational parameters of the dynamic dominant-operation simulation model, thereby establishing a dynamic multi-input multi-output hybrid semi-mechanistic simulation model for dominant operation of the wind turbine generator assembly under all working statuses that is driven by dual sources of mechanism and data. In this way, the operation process of the wind turbine generator assembly can be simulated more realistically by establishing each of the submodels, which helps to improve the accuracy of the simulation results.

In order to provide a clearer understanding of the above objects, features, and advantages of the present disclosure, preferable embodiments will be given below and described in detail with reference to the accompanying drawings.

BRIEF DESCRIPTION OF DRAWINGS

In order to more clearly illustrate the technical solutions of embodiments of the present disclosure, drawings required to be used in the embodiments will be described briefly below. It is understood that the drawings below are merely illustrative of some embodiments of the present disclosure and thus should not be considered as limiting its scope. It will be appreciated by those of ordinary skill in the art that other relevant drawings can also be obtained according to these drawings without any inventive effort.

DETAILED DESCRIPTION OF EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure. All the other embodiments obtained by those skilled in the art in light of the embodiments of the present disclosure without inventive efforts will fall within the scope of the present disclosure as claimed.

It is found in research that currently, dynamic simulation methods related to wind turbine generator assemblies can achieve high-precision representation of the operating states of the key systems of the assemblies depending only on the input-output characteristics, but the accuracy of models is limited by the amount of training data and uniformity thereof under multiple working statuses, thus the global adaptability of the models can hardly be guaranteed, and the models are poorly interpretable. Therefore, how to construct a high-precision dynamic dominant-operation simulation model for simulating an operation process of a wind turbine generator assembly has become an urgent problem to be solved.

In view of this, an embodiment of the present disclosure provides a method for simulating a dynamic digital twin model of dominant operation of a wind turbine generator assembly, by which an operation process of the wind turbine generator assembly can be simulated more realistically, and the accuracy of the simulation results can be improved.

Figure 1:
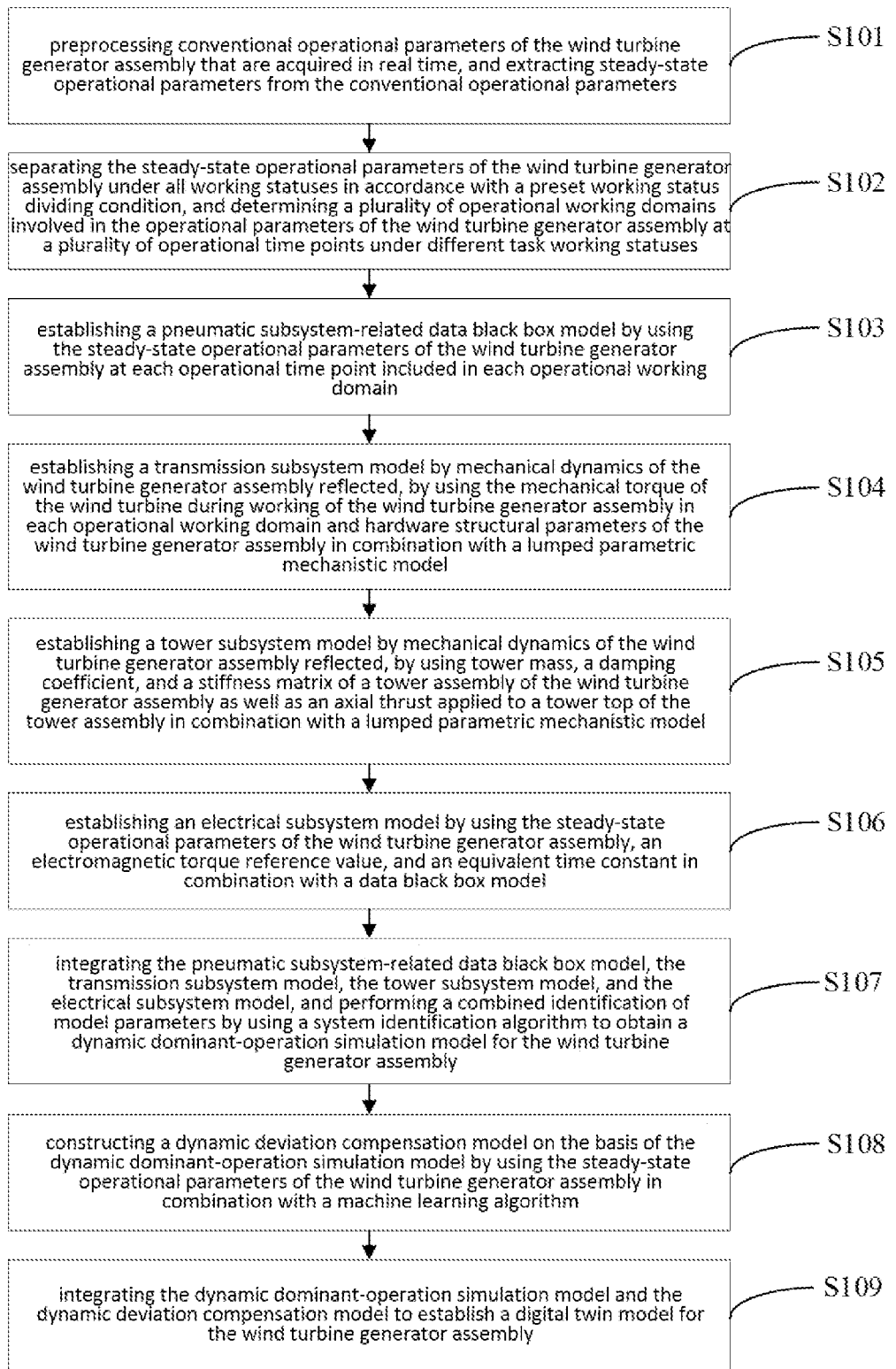
FIG. 1 is a flowchart of a method for simulating a dynamic digital twin model of dominant operation of a wind turbine generator assembly according to an embodiment of the present disclosure.

Referring to FIG. 1, FIG. 1 is a flowchart of a method for simulating a digital twin model of dominant operation of a wind turbine generator assembly according to an embodiment of the present disclosure. As shown in FIG. 1, the method for simulating a digital twin model of dominant operation of a wind turbine generator assembly according to an embodiment of the present disclosure comprises:

S101 of preprocessing conventional operational parameters of the wind turbine generator assembly that are acquired in real time, and extracting steady-state operational parameters from the conventional operational parameters;

S102 of separating the steady-state operational parameters of the wind turbine generator assembly under all working statuses in accordance with a preset working status dividing condition, and determining a plurality of operational working domains involved in the operational parameters of the wind turbine generator assembly at a plurality of operational time points under different task working statuses;

S103 of establishing a pneumatic subsystem-related data black box model by using the steady-state operational parameters of the wind turbine generator assembly at each operational time point included in each operational working domain;

S104 of establishing a transmission subsystem model by mechanical dynamics of the wind turbine generator assembly reflected, by using the mechanical torque of the wind turbine during working of the wind turbine generator assembly in each operational working domain and hardware structural parameters of the wind turbine generator assembly in combination with a lumped parametric mechanistic model;

S105 of establishing a tower subsystem model by mechanical dynamics of the wind turbine generator assembly reflected, by using tower mass, a damping coefficient, and a stiffness matrix of a tower assembly of the wind turbine generator assembly as well as an axial thrust applied to a tower top of the tower assembly in combination with a lumped parametric mechanistic model;

S106 of establishing an electrical subsystem model by using the steady-state operational parameters of the wind turbine generator assembly, an electromagnetic torque reference value, and an equivalent time constant in combination with a data black box model;

S107 of integrating the pneumatic subsystem-related data black box model, the transmission subsystem model, the tower subsystem model, and the electrical subsystem model, and performing a combined identification of model parameters by using a system identification algorithm to obtain a dynamic dominant-operation simulation model for the wind turbine generator assembly;

S108 of constructing a dynamic deviation compensation model on the basis of the dynamic dominant-operation simulation model by using the steady-state operational parameters of the wind turbine generator assembly in combination with a machine learning algorithm; and S109 of integrating the dynamic dominant-operation simulation model and the dynamic deviation compensation model to establish a digital twin model for the wind turbine generator assembly.

In a method for simulating a dynamic digital twin model of dominant operation of a wind turbine generator assembly according to an embodiment of the present disclosure, conventional operational parameters of the wind turbine generator assembly that are acquired in real time are preprocessed to obtain steady-state operational parameters of the wind turbine generator assembly, considering that the collected conventional operational parameters contain abnormal and unstable operational parameters because the wind turbine generator assembly is susceptible to interference or influence from various random uncertain events such as the external environment, signal measurement and transmission, etc. A pneumatic subsystem-related data black box model, a transmission subsystem model, a tower subsystem model, and an electrical subsystem model are simulated individually using the steady-state operational parameters, and then combined to form a dynamic dominant-operation simulation model for simulating an operation process of the wind turbine generator assembly. Meanwhile, a dynamic deviation compensation model is constructed on the basis of the dynamic dominant-operation simulation model to achieve compensation for operational parameters and loaded operational parameters of the dynamic dominant-operation simulation model. In this way, the operation process of the wind turbine generator assembly can be simulated more realistically by establishing each of the submodels, which helps to improve the accuracy of the simulation results.

For a wind turbine generator assembly, the wind turbine generator assembly comprises at least two parts: a transmission part and a tower assembly. Conventional operational parameters in the transmission part that can be monitored in real time in a production scenario where the wind turbine generator assembly is arranged are divided into at least two parts: control input parameters and disturbance input parameters. Here, the control input parameters include at least an electromagnetic torque $T_e$ of a generator part and a pitch angle $\beta$ of a wind turbine. The disturbance input parameters include at least a wind velocity V upstream of the wind turbine generator assembly, a rotational speed $\omega_r$ of the wind turbine, and a mechanical torque $T_r$ of the wind turbine. The tower assembly part includes at least tower mass, a damping coefficient, a stiffness matrix, and an axial thrust matrix.

Considering that the monitored operational parameters of the wind turbine generator assembly exhibit a strong correlation with time series and are susceptible to interference and influence from various random uncertain events such as an external environment where the wind turbine generator assembly is deployed, signal interference, etc., the directly acquired conventional operational parameters contain abnormal and/or unstable operational parameters. These abnormal and/or unstable operational parameters will also affect the accuracy and reliability of the estimated loaded operational parameters. Therefore, in order to avoid estimating inaccurate loaded operational parameters, it is necessary to firstly preprocess the conventional operational parameters monitored in real time to filter out abnormal and/or unstable operational parameters carried by the conventional operational parameters.

In the step S101, conventional operational parameters of the wind turbine generator assembly that are monitored in real time are preprocessed to filter out abnormal and/or unstable operational parameters carried by the conventional operational parameters and obtain steady-state operational parameters that can be used in estimation of loaded operational parameters, where the conventional operational parameters are parameters acquired during real-time operation of the wind turbine generator assembly.

Here, the conventional operational parameters are parameters acquired during real-time operation of the wind turbine generator assembly. The steady-state operational parameters refer to operational parameters acquired when the wind turbine generator assembly is in a stable operation state, and the stable operational parameters are relatively accurate, from which loaded operational parameters of the wind turbine generator assembly can be more accurately estimated.

In one embodiment, the step S101 comprises the following steps.

In S1011, abnormal operational parameters are filtered out from the conventional operational parameters by reference to reference values for operational parameters of the wind turbine generator assembly to obtain compliant operational parameters.

In this step, abnormal operational parameters are filtered out from the conventional operational parameters by reference to operational parameter reference values for the respective operational parameters of the wind turbine generator assembly in the actual operation process based on an operation mechanism and related control strategy of the wind turbine generator assembly to obtain compliant operational parameters of the wind turbine generator assembly which have parameter values within a compliance range.

At this time, although the abnormal operational parameters are filtered out from the conventional operational parameters, the working state of the wind turbine generator assembly changes during working, and the wind turbine generator assembly is in an unstable state while the working state is being changed, thus the operational parameters acquired in this case are also unstable. Therefore, such unstable operational parameters cannot be used in estimation of loaded operational parameters.

In S1012, preliminary steady-state parameters are preliminarily extracted from the compliant operational parameters located in a specific window with a preset window length by using a random sampling consensus algorithm.

In this step, firstly, a specific window is set in accordance with a preset window length. Then, the specific window is controlled to slide on the compliant operational parameters in accordance with a preset window shift. Finally, preliminary steady-state parameters are preliminarily extracted from the compliant operational parameters located in the specific window with the preset window length by calculating steady-state values of the compliant operational parameters located in the specific window.

Figure 2:
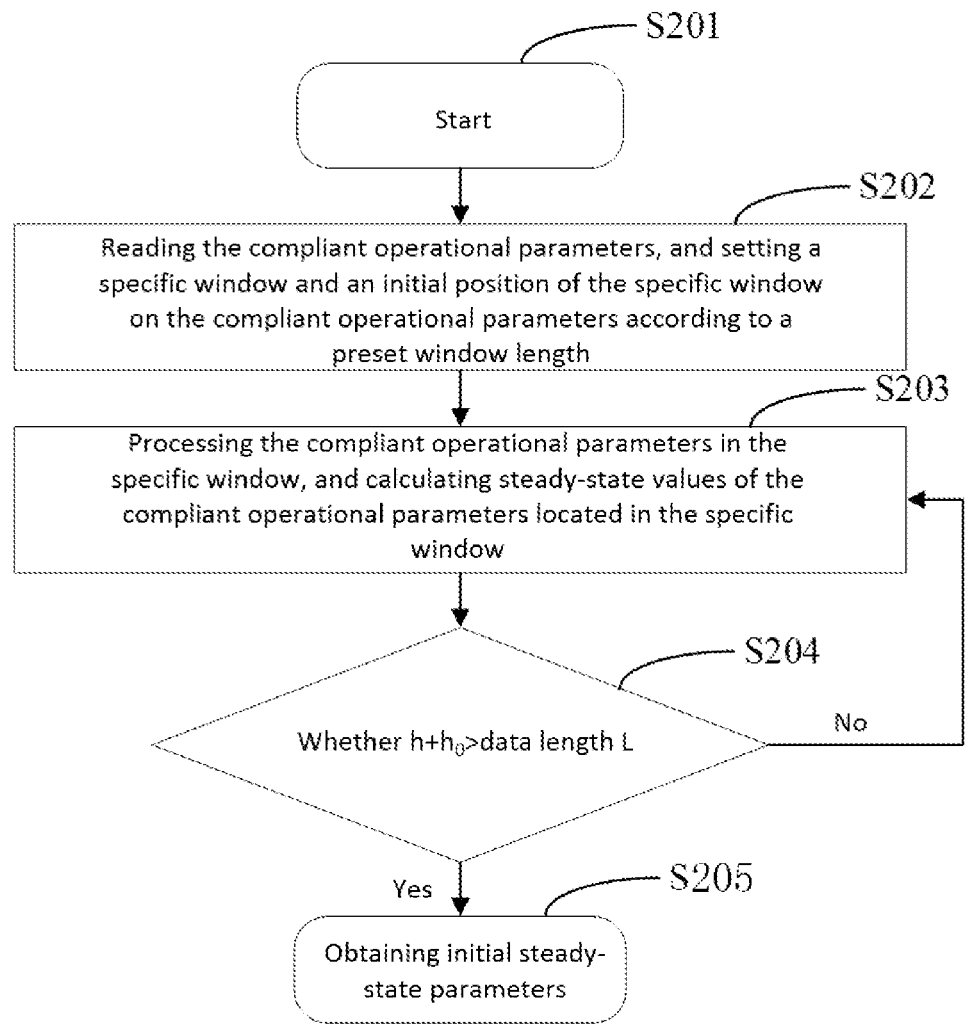
FIG. 2 is a schematic diagram of an extraction process for steady-state data according to an embodiment of the present disclosure.

Exemplarily, referring to FIG. 2, FIG. 2 is a schematic diagram of a steady-state data extraction process according to an embodiment of the present disclosure. As shown in FIG. 2, step S201 responds to a start of a steady-state data extraction event. In step S202, the compliant operational parameters (the compliant operational parameters have a length L) are read, and a specific window and an initial position $h_0$ of the specific window on the compliant operational parameters are set according to a preset window length h. In step S203, the specific window is slid on the compliant operational parameters, the compliant operational parameters in the specific window are processed, and steady-state values of the compliant operational parameters located in the specific window are calculated. In step S204, it is judged whether the sum of the preset window length h and the initial position $h_0$ is greater than the length L of the compliant operational parameters; if yes, step S205 is executed; and if not, the step S203 is executed. In step S205, initial steady-state parameters are obtained.

In S1013, steady-state operational parameters are extracted from the preliminary steady-state parameters by fitting the preliminary steady-state parameters using a least-squares fitting algorithm and by means of a data fitted curve obtained by the fitting.

In this step, the preliminary steady-state parameters are fitted by using a least-squares fitting algorithm, and a data fitted curve is obtained by constructing a model for data fitting curve. A number of data points closest to the data fitted curve are selected from each specific window as steady-state operational parameters in the specific window according to the quantity of steady-state operational parameters required, all the preliminary steady-state parameters are slidingly traversed, and the steady-state operational parameters are extracted from the preliminary steady-state parameters.

Specifically, the model for data fitting curve is expressed as follows:

$$x = P_0 + P_1 i^1 + P_2 i^2 + \ldots + P_m i^m;$$

where $P_0$ denotes the magnitude of a mean value in the window; and $P_1$ denotes a slope, i.e., a rate, at which the variable changes over time.

In the step S102, a plurality of operational working domains involved in operational parameters at a plurality of operational time points generated during operation of the wind turbine generator assembly are determined by separating the steady-state operational parameters of the wind turbine generator assembly under all working statuses, based on the steady-state operational parameters of the wind turbine generator assembly, in accordance with a preset working status dividing condition.

Here, the all working statuses include at least a normal power generation status and a power restriction and wind power curtailment status.

In one embodiment, the step S102 comprises the following steps.

In S1021, a finite difference regressive vector at each operational time point for the wind turbine generator assembly is established by using the steady-state operational parameters.

In this step, a finite difference regressive vector $x_{RV}(k)$, which can represent the dynamics of dominant operation of the wind turbine generator assembly under all working statuses, is defined by using the steady-state operational parameters of the wind turbine generator assembly in consideration of the delay characteristics of the wind turbine generator assembly during operation.

Here, the steady-state operational parameters u(k) include at least the electromagnetic torque $T_e$ of the generator, the pitch angle $\beta$ of the wind turbine, the wind velocity V upstream of the wind turbine generator assembly, the rotational speed $\omega_r$ of the wind turbine, and the mechanical torque $T_r$ of the wind turbine, i.e., u(k)=[$T_e$(k)$\beta$(k)$\omega_r$(k) V(k)$T_r$(k)]. The finite difference regressive vector $x_{RV}(k)$ further includes loaded operational parameters y(k) of the wind turbine generator assembly. The loaded operational parameters y(k) include at least a torque $T_{shaft}$ of an intermediate shaft of a gearbox and a rotational speed $\omega_g$ of the generator. The rotational speed $\omega_g$ of the generator is a measurable loaded operational parameter, and the torque $T_{shaft}$ of the intermediate shaft of the gearbox is a loaded operational parameter to be estimated. Namely, y(k)=[$T_{shaft}$(k) $\omega_g$(k)]. The steady-state operational parameters u(k) and the loaded operational parameters y(k) are combined to obtain the finite difference regressive vector at the operational time point k for the wind turbine generator assembly as follows: $x_{RV}(k)$=[$T_e$(k−1) ... $T_e$(k−$n_a$)$\beta$(k−1) ... $\beta$(k−$n_a$) $\omega_r$(k−1) ... $\omega_r$(k−$n_a$) V(k−1) ... V(k−$n_a$) $T_r$(k−1) ... $T_r$(k−$n_a$)$\omega_g$(k−1) ... $\omega_g$(k−$n_b$) ... $T_{Shaft}$(k−1) ... $T_{Shaft}$(k−$n_b$)]$^T$, where $n_a$ and $n_b$ are the order of input delay and the order of output delay, respectively, and $n_k$ is the input lag time.

Here, $n_a$, $n_b$, and $n_k$ are also determined by using a curve fitting method. Specifically, a polynomial is established as follows: the calculated output=f($n_a$, $n_b$, $n_k$, actual input). The calculated output and the actual output are fitted by using a least squares algorithm, and the most suitable $n_a$, $n_b$, and $n_k$ are selected based on AIC criterion.

Here, the finite difference regressive vector includes the operational parameters and loaded operational parameters of the wind turbine generator assembly at a plurality of operational time points.

In S1022, the finite difference regressive vectors at the plurality of operational time points are divided into a plurality of local datasets by determining a Euclidean distance between the finite difference regressive vector at each operational time point and the finite difference regressive vector at a central time point.

In this step, the finite difference regressive vectors at the plurality of operational time points are divided into a plurality of local datasets by clustering the finite difference regressive vectors at the plurality of operational time points. Specifically, the division of the operational parameters may be achieved by calculating a Euclidean distance between the finite difference regressive vector at each operational time point and the finite difference regressive vector at a selected central time point.

Here, the central time point is determined randomly.

In one embodiment, the step S1022 comprises the following steps.

In S10221, a plurality of central time points are randomly determined from a plurality of time points.

In S10222, for each central time point, a Euclidean distance between the finite difference regressive vector at each time point and the finite difference regressive vector at the central time point is calculated.

In this step, each central time point is used as a data center, respectively, and for each central time point, a local dataset of the central time point is established. Finite difference regressive vectors included in the local dataset of the central time point are finite difference regressive vectors at other operational time points adjacent to the central time point.

The Euclidean distances between the finite difference regressive vector at the central time point and the finite difference regressive vectors at other operational time points are calculated, where the other operational time points may be other operational time points other than the central time point, or may be all the operational time points including the central time point, which may be determined according to the actual situation and is not limited here.

In S10223, an operational time point, at which the Euclidean distance is less than a preset distance threshold, is determined as a target time point in a local dataset corresponding to the central time point.

In this step, operational time points that can be incorporated into a local dataset corresponding to the central time point are judged by using the Euclidean distances. Operational time points, at which the Euclidean distances from the operational parameters at the central time point are smaller than a preset distance threshold, are determined as target time points incorporated into the local dataset corresponding to the central time point.

In S10224, the local dataset corresponding to the central time point is created based on the finite difference regressive vector for the wind turbine generator assembly at each target time point.

In this step, after the target time points that should be included in the local dataset corresponding to the central time point are determined, the local dataset corresponding to the central time point is created based on the finite difference regressive vector for the wind turbine generator assembly at each target time point.

In S1023, a local regressive vector of each local dataset is determined with reference to the finite difference regressive vector.

In this step, a local regressive vector of each local dataset may be established with reference to the finite difference regressive vector. Here, the finite difference regressive vector includes the steady-state operational parameters and loaded operational parameters of the wind turbine generator assembly at each operational time point. Therefore, in fact, a target parameter vector $\Phi_h$ of each local dataset is obtained in a combined manner based on the finite difference regressive vectors at the target time points in each local dataset.

$$\Phi_h = \begin{bmatrix} x_{RV,1} & x_{RV,2} & \cdots & x_{RV,l} \\ 1 & 1 & \cdots & 1 \end{bmatrix};$$

where $\Phi_h$ is the target parameter vector of the $h^{th}$ local dataset, l is the number of the target time points included in the local dataset, and $x_{RV,l}$ is the finite difference regressive vector at the $l^{th}$ target time point in the local dataset.

For each local dataset, a local regressive vector $PV_h$ of the local dataset is determined by using the target parameter vector $\Phi_h$ of the local dataset in combination with a least-squares calculation formula. Specifically, the local regressive vector $PV_h$ of each local dataset is calculated by the following formula:

$$PV_h = (\Phi_h^T \Phi_h)^{-1} \Phi_z^T \begin{bmatrix} y_{C_h,1} \\ \vdots \\ y_{C_h,l} \end{bmatrix};$$

where $PV_h$ is the local regressive vector of the $h^{th}$ local dataset, $\Phi_h$ is the target parameter vector of the $h^{th}$ local dataset, and $y_{C_h,l}$ is the loaded operational parameter at the $l^{th}$ target time point in the $h^{th}$ local dataset.

In S1024, the local regressive vector of each local dataset and a vector mean value of each local regressive vector are combined to obtain an assembly feature vector for the wind turbine generator assembly.

In this step, a vector mean value $M_h$ of each local dataset is determined based on the local regressive vector $PV_h$ of each local dataset. The local regressive vector $PV_h$ of each local dataset and the vector mean value $M_h$ of each local dataset are combined to form an assembly feature vector FV for the wind turbine generator assembly, i.e., FV= $[(PV_1)^T \ldots (PV_h)^T M_h]^T$.

In S1025, a plurality of operational working domains involved in the operational parameters of the wind turbine generator assembly at the plurality of operational time points are determined by performing high-dimensional clustering processing on the assembly feature vectors.

In this step, a plurality of operational working domains involved in the operational parameters of the wind turbine generator assembly at the plurality of operational time points are determined by performing high-dimensional clustering processing on the assembly feature vectors using a bi-Kmeans clustering algorithm.

In one embodiment, the step S1025 comprises the following steps.

In S10251, the operational parameters of the wind turbine generator assembly at the plurality of operational time points are divided into a plurality of working domains to be estimated, by performing high-dimensional clustering processing on the assembly feature vectors.

In this step, a plurality of working domains to be estimated, to which the operational parameters of the wind turbine generator assembly at the plurality of operational time points respectively belong, are determined by performing high-dimensional clustering processing on the assembly feature vectors using a bi-Kmeans clustering algorithm.

At this time, only the division of the working domains for the operational parameters at the plurality of operational time points is achieved, and a range covered by each working domain is not determined. Therefore, on this basis, it is necessary to further estimate a working domain boundary of each working domain to be estimated.

In S10252, for each working domain to be estimated, a working domain boundary of the working domain to be estimated is estimated by establishing a hyperplane equation for the working domain to be estimated using the operational parameters located at each operational time point in the working domain to be estimated, thereby determining a plurality of operational working domains involved in the operational parameters of the wind turbine generator assembly at the plurality of operational time points.

In this step, for each working domain to be estimated, the estimation of the working domain boundary of the working domain to be estimated may be achieved by establish a hyperplane equation related to the working domain to be estimated using the operational parameters located at each operational time point in the working domain to be estimated.

Thus, the determination of a plurality of operational working domains involved in the operational parameters of the wind turbine generator assembly at the plurality of operational time points is completed by individually determining the operational working domains for each working domain to be estimated.

Here, the operational parameters are not necessarily completely linearly dividable. Therefore, equation coefficients involved in each hyperplane equation should be determined by using a soft-margin support vector machine algorithm (SS-SVM) with better robustness and generalization capability.

In one embodiment, equation coefficients involved in a hyperplane equation for each working domain to be estimated are determined by the following step.

For each working domain to be estimated, equation coefficients involved in a hyperplane equation for the working domain to be estimated are determined by using a soft-margin support vector machine algorithm based on the operational parameters located at each operational time point in the working domain to be estimated.

In this step, for each working domain to be estimated, the operational parameters located at each operational time point in the working domain to be estimated are inputted into a soft-margin support vector machine (SS-SVM) algorithm, and the equation coefficients involved in the optimal hyperplane equation for the working domain to be estimated can be obtained by solving the soft-margin support vector machine (SS-SVM) algorithm.

$$\min J = \frac{1}{2}\phi^T\phi + \gamma\sum_{k=1}^{m}\zeta_k,$$
$$\text{s.t. } y_k(\phi^T x_{RV,k} + g) \geq 1 - \zeta_k, (\zeta_k \geq 0, k = 1, 2, \ldots, m)$$

where $\phi$ and $g$ are a normal vector to and an offset for the hyperplane corresponding to the working domain to be estimated, respectively; $\gamma$ is a penalty coefficient, which represents the degree of penalty for misclassified samples and has a value in a range of (0, 1); $\zeta k$ is a slack variable, which reflects whether data satisfies a hard margin constraint $y_k(\phi^T x_{RV} + g)$; $y_k$ is a classification label corresponding to the operational parameters, which has two values: 1 and −1; and m is the total data quantity of the operational parameters located at the operational time points in the working domain to be estimated.

Figure 3:
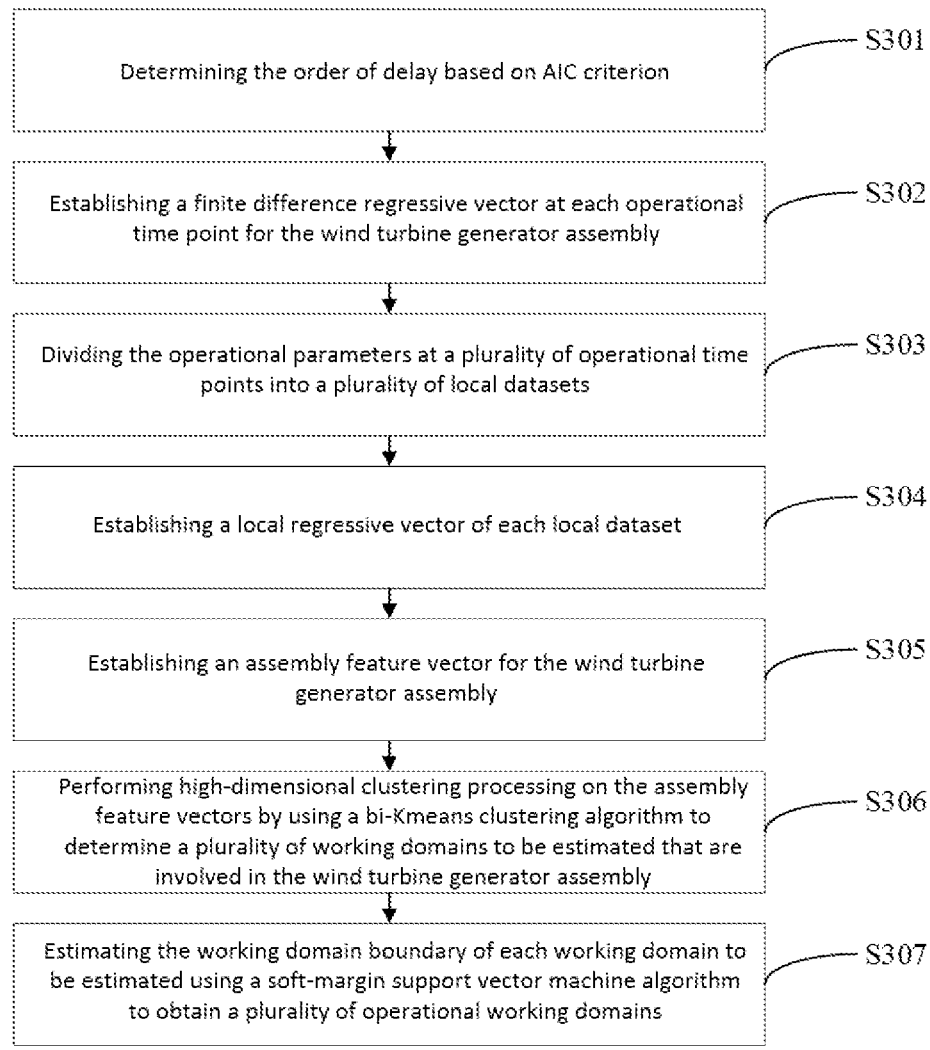
FIG. 3 is a schematic diagram of a process of estimation of operational working domains according to an embodiment of the present disclosure.

Referring to FIG. 3, FIG. 3 is a schematic diagram of a process of estimation of operational working domains according to an embodiment of the present disclosure. As shown in FIG. 3, in S301, the order of delay is determined based on AIC criterion. In S302, a finite difference regressive vector at each operational time point for the wind turbine generator assembly is established. In S303, the operational parameters at a plurality of operational time points are divided into a plurality of local datasets. In S304, a local regressive vector of each local dataset is established. In S305, an assembly feature vector for the wind turbine generator assembly is established. In S306, high-dimensional clustering processing on the assembly feature vectors is performed by using a bi-Kmeans clustering algorithm to determine a plurality of working domains to be estimated that are involved in the wind turbine generator assembly. In S307, the working domain boundary of each working domain to be estimated is estimated using a soft-margin support vector machine algorithm (SS-SVM) to obtain a plurality of operational working domains.

In the step S103, a pneumatic subsystem-related data black box model for determining the mechanical torque of the wind turbine during working of the wind turbine generator assembly in each operational working domain is established by using the steady-state operational parameters of the wind turbine generator assembly at each operational time point included in each operational working domain.

In general, the mechanical torque $T_r$ of the wind turbine during working of the wind turbine generator assembly in the operational working domain is calculated by the following formula:

$$T_r = \frac{P}{\omega_r} = \frac{1}{2}\rho\pi R^3 C_T(\lambda, \beta)V^2;$$

where $T_r$ is the mechanical torque of the wind turbine during working in the operational working domain, P is the actual power captured by the wind turbine of the wind turbine generator assembly, $\omega_r$ is the rotational speed of the wind turbine, $\beta$ is the pitch angle of the wind turbine, $\lambda$ is a tip speed ratio, V is the wind velocity upstream of the wind turbine generator assembly, $C_T$ is a torque coefficient, $\rho$ is air density, and R is the radius of the wind turbine.

$C_T(\lambda, \beta) = C_P(\lambda,\beta)/\lambda$, where $C_P$ is a wind energy utilization coefficient.

The actual power captured by the wind turbine of the wind turbine generator assembly is expressed as $$P = \frac{1}{2}\rho\pi R^2 C_P V^3.$$

It can be seen by reference to the above formula that the mechanical torque $T_r$ of the wind turbine is a nonlinear function of the rotational speed $\omega_r$ of the wind turbine, the pitch angle $\beta$ of the wind turbine, and the wind velocity V upstream of the wind turbine generator assembly. In other words, there is a nonlinear relationship between the mechanical torque $T_r$ of the wind turbine, the rotational speed $\omega_r$ of the wind turbine, the pitch angle $\beta$ of the wind turbine, and the wind velocity V upstream of the wind turbine generator assembly. Such a nonlinear relationship can hardly be described with a simple single model suitable for use in the global scope. Therefore, considering the problem that it cannot be described with a single model, it is necessary to convert the above nonlinear relationship into a linear relationship before constructing a pneumatic subsystem-related data black box model. Specifically, it is possible to choose to include a finite number of dynamic submodels to perform a conversion between different submodels according to a switching law. For example, the nonlinear relationship between the mechanical torque $T_r$ of the wind turbine, the rotational speed $\omega_r$ of the wind turbine, the pitch angle β of the wind turbine, and the wind velocity V upstream of the wind turbine generator assembly may be fitted by a piecewise autoregressive exogenous (PWARX) model and thus converted into a linear relationship.

In one embodiment, the step S103 comprises the following steps.

In S1031, a nonlinear relationship between the steady-state operational parameters of the wind turbine generator assembly at each operational time point included in each operational working domain is converted into a linear relationship by using a pretrained black box model to obtain steady-state operational parameters having a linear relationship therebetween.

In this step, the conversion of the nonlinear relationship between the steady-state operational parameters of the wind turbine generator assembly at each operational time point included in each operational working domain is achieved by using a pretrained black box model. In other words, the nonlinear relationship between the steady-state operational parameters (e.g., the nonlinear relationship between the mechanical torque $T_r$ of the wind turbine, the rotational speed $\omega_r$ of the wind turbine, the pitch angle β of the wind turbine, and the wind velocity V upstream of the wind turbine generator assembly) at each operational time point is converted into a linear relationship by the pretrained black box model to obtain steady-state operational parameters having a linear relationship therebetween.

In S1032, a pneumatic subsystem-related data black box model is established by using the steady-state operational parameters of the wind turbine generator assembly having a linear relationship therebetween at each operational time point included in each operational working domain.

In this step, a pneumatic subsystem-related data black box model is established by using the steady-state operational parameters having a linear relationship therebetween of the wind turbine generator assembly at each operational time point included in each operational working domain that are converted by the black box model.

The pneumatic subsystem-related data black box model is established by using the converted steady-state operational parameters having a linear relationship therebetween as follows:

$$T_{r,i}(k) = a_{1,i}\omega_{r,i}(k-1) + \ldots + a_{n_a,i}\omega_{r,i}(k-n_a) + $$
$$b_{1,i}\beta_i(k-1) + \ldots + b_{n_a,i}\beta_i(k-n_a) + c_{1,i}V_i(k-1) + \ldots + $$
$$c_{n_a,i}V_i(k-n_a) + d_{1,i}T_{r,i}(k-1) + \ldots + d_{n_b,i}T_{r,i}(k-n_b) \text{ if } X(k) \in \chi_i;$$

where $T_{r,i}(k)$ is the mechanical torque of the wind turbine in the $i^{th}$ operational working domain at the $k^{th}$ operational time point; $X(k)$ is the operational parameter in the $i^{th}$ operational working domain at the $k^{th}$ operational time point, where $X(k)=[\omega_r(k-1), \ldots, \omega_r(k-n_a), \beta(k-1), \ldots, \beta(k-n_a), V(k-1), \ldots, V(k-n_a), T_r(k-1), \ldots, T_r(k-n_b)]$; $n_a$ and $n_b$ are the orders of input and output delays, respectively; $X_i$ is the $i^{th}$ operational working domain; and $a_i$, $b_i$, $c_i$, and $d_i$ are coefficients for different variables, respectively.

Here, the data black box model may include, but is not limited to, a static parametric model, such as a piecewise affine (PWA) model or a linear regression model; a dynamic parametric model, such as an autoregressive exogenous (ARX) model or a piecewise autoregressive exogenous (PWARX) model; a neural network model, such as a recurrent neural network (RNN) model or a graphic neural network (GNN) model; and other data black box models.

When the established pneumatic subsystem-related data black box model is used, the mechanical torque of the wind turbine during working of the wind turbine generator assembly in each operational working domain can be determined based on the inputted steady-state operational parameters at each operational time point included in each operational working domain.

In the step S104, assuming that the wind turbine generator assembly has a flexible low-speed shaft and a rigid high-speed shaft, namely, in a case where the rotational friction and torsional deformation of the low-speed shaft of the wind turbine generator assembly are taken into consideration, a transmission subsystem model is established by mechanical dynamics of the wind turbine generator assembly during operation reflected, by using the mechanical torque of the wind turbine during working of the wind turbine generator assembly in each operational working domain and hardware structural parameters of the wind turbine generator assembly in combination with a lumped parametric mechanistic model.

Here, the transmission subsystem model is used for determining a torque of an intermediate shaft of a gearbox during working of the wind turbine generator assembly in each operational working domain, and the mechanical dynamics are used for reflecting an operating state of each hardware facility of the wind turbine generator assembly.

Here, the lumped parametric mechanistic model may include a single-mass model, a double-mass model, a triple-mass model, and the like. A target parametric model may be further determined from a plurality of lumped parametric mechanistic models using preset mechanistic information, in order to achieve a more accurate simulation of the operation process of the wind turbine generator assembly.

In one embodiment, the step S104 comprises the following steps.

In S1041, a target parametric model is selected from a plurality of preset lumped parametric mechanistic models using preset mechanistic information.

In this step, a target parametric model more suitable for the wind turbine generator assembly is selected, from a plurality of lumped parametric mechanistic models capable of achieving the transformation of nonlinear relationships, using preset mechanistic information indicating information on construction of a dynamic dominant-operation simulation model for simulating the wind turbine generator assembly, so as to realize a better conversion of the steady-state operational parameters of the wind turbine generator assembly having a nonlinear relationship therebetween into steady-state operational parameters having a linear relationship therebetween.

Here, the preset mechanistic information refers to preset information such as the structure, function, and connection mode of each subsystem of the wind turbine generator assembly.

In S1042, a transmission subsystem model is established by mechanical dynamics of the wind turbine generator assembly reflected, by using the target parametric model based on the mechanical torque of the wind turbine during working of the wind turbine generator assembly in each operational working domain and hardware structural parameters of the wind turbine generator assembly.

In this step, a transmission subsystem model capable of indicating mechanical dynamics of the wind turbine generator assembly is established by the mechanical dynamics of the wind turbine generator assembly during operation reflected, by using the selected target parametric model based on the mechanical torque of the wind turbine during working of the wind turbine generator assembly in each operational working domain and hardware structural parameters of the wind turbine generator assembly. In other words, the transmission subsystem model can be established to reflect the mechanical dynamics of the wind turbine generator assembly during operation.

Here, the hardware structural parameters refer to structural indicators that have been set in the actual production of the wind turbine generator assembly, for example parameters such as a moment of inertia $J_r$ of a rotor of the wind turbine, a moment of inertia $J_g$ of a rotor of the generator, and a transmission ratio Ng of the gearbox.

At this point, as an example, the selected target parametric model is a double-mass model. In this case, the transmission subsystem model is established as follows:

$$\begin{cases} J_r \dot{\omega}_r = T_r - T_{shaft} \\ T_{shaft} = A_{stif} \left( \delta_r - \frac{\delta_g}{N_g} \right) + B_{damp} \left( \omega_r - \frac{\omega_g}{N_g} \right); \\ J_g \dot{\omega}_g = \frac{T_{shaft}}{N_g} - T_e \end{cases}$$

where $T_{shaft}$ is the torque $T_{shaft}$ of the intermediate shaft of the gearbox, $\omega_g$ is the rotational speed of the generator, $J_r$ and $J_g$ are the moments of inertia of the rotor of the wind turbine and of the rotor of the generator, respectively, and $\delta_r$ and $\delta_g$ are angular displacements on the rotor side of the wind turbine and on the rotor side of the generator; $N_g$ is the gear ratio of the gearbox; and $A_{stif}$ and $B_{damp}$ are a stiffness coefficient and a damping coefficient for the torque of the intermediate shaft of the gearbox.

When the established transmission subsystem model is used, the torque of the intermediate shaft of the gearbox during working of the wind turbine generator assembly in each operational working domain can be determined based on the inputted mechanical torque of the wind turbine during working of the wind turbine generator assembly in each operational working domain and the hardware structural parameters of the wind turbine generator assembly.

A wind turbine generator assembly further comprises a tower assembly. The tower assembly part is the main support device in the wind turbine generator assembly. Since the wind turbine generates an axial thrust while capturing wind energy, a coupled vibration system is formed when the axial thrust is exerted on the tower.

In the step S105, a tower subsystem model for simulating the tower assembly part is further constructed, in order to achieve a comprehensive simulation of the operation process of the wind turbine generator assembly. Specifically, the tower subsystem model is established by using the tower mass, the damping coefficient, and the stiffness matrix of the tower assembly of the wind turbine generator assembly as well as the axial thrust applied to the tower top of the tower assembly in combination with a second-order harmonic damping algorithm, where the tower subsystem model is used for determining a vibrational displacement of the tower top of the tower assembly.

Specifically, the tower subsystem model is expressed as follows:

$$M\ddot{q} + C\dot{q} + Kq = F;$$

where M is the tower mass of the tower assembly, C is the damping coefficient for the tower assembly, K is the stiffness matrix for the tower assembly, F is the axial thrust applied to the tower top, and q, $\dot{q}$, and $\ddot{q}$ are the vibrational displacement of the tower top, the vibration velocity of the tower top, and the vibrational acceleration of the tower top in the forward-backward direction of the tower top, respectively.

Here, the axial thrust F applied to the tower top is expressed as follows:

$$F = \frac{T_r}{R};$$

where F is the axial thrust applied to the tower top, $T_r$ is the mechanical torque of the wind turbine, and R is the radius of the wind turbine.

When the established tower subsystem model is used, the vibrational displacement of the tower top of the tower assembly of the wind turbine generator assembly can be determined based on the inputted tower mass, damping coefficient, and stiffness matrix of the tower assembly as well as the axial thrust applied to the tower top of the tower assembly.

In the step S106, an electrical subsystem model is established by using a steady-state operational parameter of the wind turbine generator assembly, an electromagnetic torque reference value, and an equivalent time constant in combination with a first-order inertial dynamic model, where the electrical subsystem model is used for determining the electromagnetic torque of the generator during working of the wind turbine generator assembly. Therefore, the steady-state operational parameter used in the establishment of the electrical subsystem model is the electromagnetic torque $T_e$ of the generator.

The electrical subsystem model is established as follows:

$$\dot{T}_e = \frac{1}{\tau_e}(T_e^* - T_e);$$

where $T_e$ is the electromagnetic torque of the generator, $T_e^*$ is the electromagnetic torque reference value, and $\tau_e$ is the equivalent time constant.

When the established electrical subsystem model is used, a rate of change in the electromagnetic torque of the generator during working of the wind turbine generator assembly can be determined based on the inputted steady-state operational parameter, electromagnetic torque reference value, and equivalent time constant.

In the step S107, the established pneumatic subsystem-related data black box model, transmission subsystem model, tower subsystem model, and electrical subsystem model may be integrated according to the physical connection relationship and data flow relationship between the respective subsystems with reference to the preset mechanistic information to obtain a dynamic dominant-operation simulation model for simulating the operation process of the wind turbine generator assembly.

Figure 4:
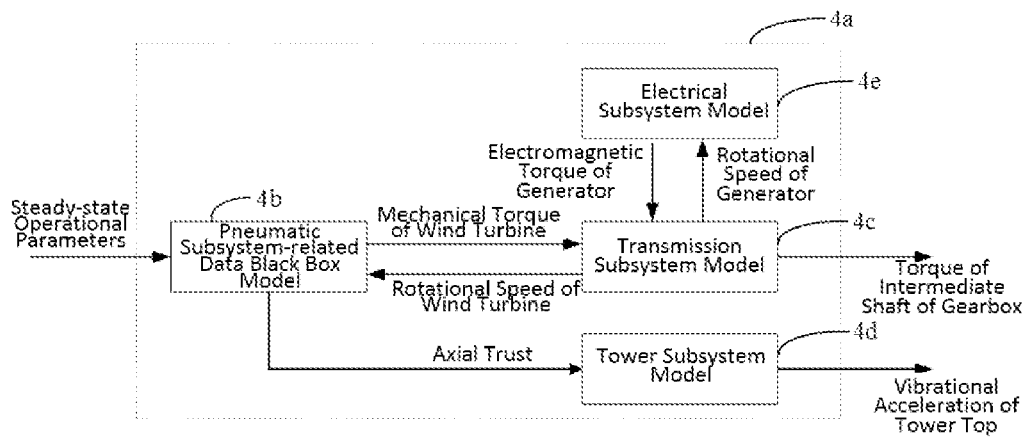
FIG. 4 is a schematic structural diagram of a dynamic dominant-operation simulation model according to an embodiment of the present disclosure.

Referring to FIG. 4, FIG. 4 is a schematic structural diagram of a dynamic dominant-operation simulation model according to an embodiment of the present disclosure. As shown in FIG. 4, the dynamic dominant-operation simulation model 4a includes a pneumatic subsystem-related data black box model 4b, a transmission subsystem model 4c, a tower subsystem model 4d, and an electrical subsystem model 4e. The steady-state operational parameters are inputted into the pneumatic subsystem-related data black box model 4b, the mechanical torque of the wind turbine is outputted from the pneumatic subsystem-related data black box model 4b to the transmission subsystem model 4c, the rotational speed of the wind turbine is fed back to the pneumatic subsystem-related data black box model 4b from the transmission subsystem model 4c, and the torque of the intermediate shaft of the gearbox is outputted from the transmission subsystem model 4c. The axial thrust applied to the tower top of the tower assembly is outputted from the pneumatic subsystem-related data black box model 4b to the tower subsystem model 4d, and the vibrational displacement of the tower top is outputted from the tower subsystem model 4d. The rotational speed of the generator is outputted from the transmission subsystem model 4c to the electrical subsystem model 4e, and the electromagnetic torque of the generator is fed back to the transmission subsystem model 4c from the electrical subsystem model 4e.

Further, if the operation process of the wind turbine generator assembly is simulated by only using the acquired steady-state operational parameters depending on the dynamic dominant-operation simulation model, the approximation accuracy is limited, and there is a case where it is difficult to simulate high-frequency dynamic operational parameters of the wind turbine generator assembly. Therefore, in order to fully consider the influence of historical data on the current estimated operational parameters during operation, a dynamic deviation compensation model is additionally set to achieve compensation for the operational parameters and loaded operational parameters, respectively, so as to simulate the operation process of the wind turbine generator assembly more accurately.

In the step S108, the compensation for the corresponding parameters during the simulation of the wind turbine generator assembly is achieved by constructing a dynamic deviation compensation model. Specifically, the dynamic deviation compensation model is constructed on the basis of the dynamic dominant-operation simulation model by employing a machine learning algorithm using the steady-state operational parameters of the wind turbine generator assembly.

Here, the dynamic deviation compensation model is used for determining an input deviation compensation term and an output deviation compensation term. The input deviation compensation term is used for compensating for the steady-state operational parameters. The output deviation compensation term is used for compensating for the loaded operational parameters outputted from the dynamic dominant-operation simulation model.

Specifically, the established dynamic deviation compensation model includes a stacked autoencoder and a long short-term memory neural network, and the input deviation compensation term and the output deviation compensation term are determined by encoding and decoding the inputted steady-state operational parameters.

The stacked autoencoder in the deviation compensation model captures intrinsic parameter characteristics of the steady-state operational parameters by encoding the steady-state operational parameters. In other words, variables that have the greatest influence on the output parameters of each subsystem are selected from the steady-state operational parameters, and processing of the steady-state operational parameters for dimensionality reduction and noise reduction is carried out to obtain steady-state operational parameters which have been subjected to the processing for dimensionality reduction and noise reduction.

Then, the original regression layer of the stacked autoencoder (SAE) is replaced with the long short-term memory neural network. The steady-state operational parameters which have been subjected to the processing for dimensionality reduction and noise reduction that are outputted from the dynamic deviation compensation model are inputted into the long short-term memory neural network. An input deviation compensation term for compensating for the steady-state operational parameters and an output deviation compensation term for loaded operational parameters outputted from the dynamic dominant-operation simulation model are determined by the long short-term memory neural network.

Here, the loaded operational parameters include at least the torque $T_{shaft}$ of the intermediate shaft of the gearbox and the rotational speed $\omega_g$ of the generator.

Here, the stacked autoencoder (SAE) is a deep neural network model consisting of multiple layers of sparse autoencoders, in which the outputs of a hidden layer of a previous layer of autoencoder are wired to the inputs of a successive layer of autoencoder, and the last layer is a classifier (logistic regression or softmax classification (predictive analysis)). The long short-term memory (LSTM) network is a time recurrent neural network, which is specially designed to solve the long-term dependency problem existing in general RNNs (recurrent neural networks). All the RNNs have the form of a chain of repeating modules of neural network.

Specifically, the dynamic deviation compensation model is constructed as follows:

$$\begin{cases} x(k+1) = A \cdot x(k) + B \cdot u(k) + f(k) \\ y(k) = C \cdot x(k) + D \cdot u(k) + g(k) \end{cases} ;$$

where $x(k+1)$ is the steady-state operational parameter at the $k+1^{th}$ operational time point, $u(k)$ is the steady-state operational parameter at the $k^{th}$ operational time point, $x(k)$ is the steady-state operational parameter at the $k^{th}$ operational time point, $f(k)$ is the input deviation compensation term, $y(k)$ is the loaded operational parameter at the $k^{th}$ operational time point, $u(k)$ is the steady-state operational parameter at the $k^{th}$ operational time point, $x(k)$ is the steady-state operational parameter at the $k^{th}$ operational time point, $g(k)$ is the output deviation compensation term, and A, B, C, and D are preset parameter matrices obtained by integrating and deriving the respective subsystem models according to the preset mechanistic information.

Figure 5:
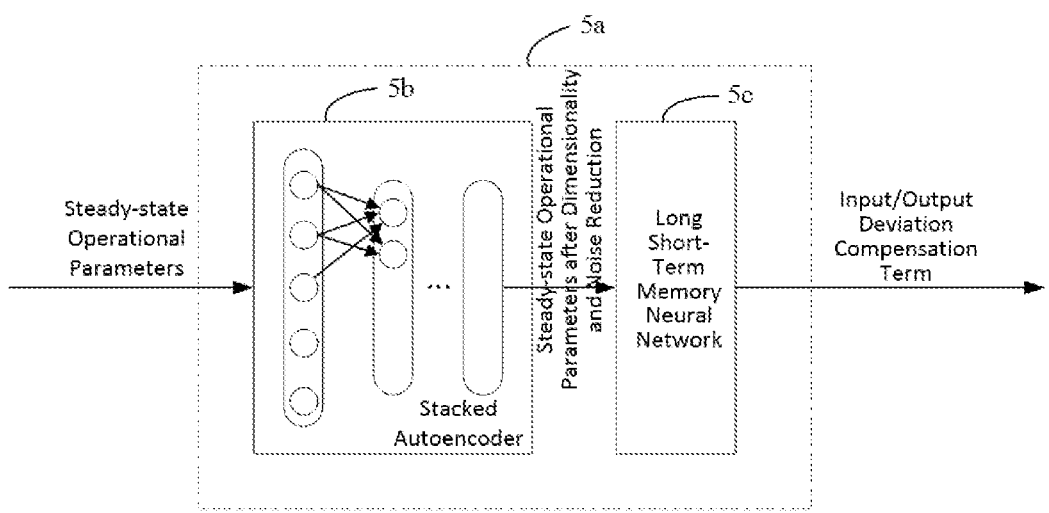
FIG. 5 is a schematic structural diagram of a dynamic deviation compensation model according to an embodiment of the present disclosure.

Referring to FIG. 5, FIG. 5 is a schematic structural diagram of a dynamic deviation compensation model according to an embodiment of the present disclosure. As shown in FIG. 5, the dynamic deviation compensation model 5a includes a stacked autoencoder 5b and a long short-term memory neural network 5c. The steady-state operational parameters are inputted into the stacked autoencoder 5b, and processing of the steady-state operational parameters for dimensionality reduction and noise reduction is carried out by the stacked autoencoder 5b having a multilayered structure to obtain steady-state operational parameters which have been subjected to the processing for dimensionality reduction and noise reduction. Then, the steady-state operational parameters which have been subjected to the processing for dimensionality reduction and noise reduction are inputted into the long short-term memory neural network 5c, and an input deviation compensation term for compensating for the steady-state operational parameters is determined by the long short-term memory neural network 5c.

In step S109, a dynamic multi-input multi-output hybrid semi-mechanistic simulation model for dominant operation of the wind turbine generator assembly under all working statuses that is driven by dual sources of mechanism and data for the wind turbine generator, i.e., a digital twin model for the wind turbine generator assembly, is established by integrating the dynamic dominant-operation simulation model and the dynamic deviation compensation model. Here, the established digital twin model is capable of simulating the operation process of the wind turbine generator assembly more realistically, obtaining a more realistic simulation effect, and improving the approximation accuracy of the simulation results.

In the method for simulating a dynamic digital twin model of dominant operation of a wind turbine generator assembly according to an embodiment of the present disclosure, conventional operational parameters of the wind turbine generator assembly that are acquired in real time are preprocessed to obtain steady-state operational parameters of the wind turbine generator assembly, considering that the collected conventional operational parameters contain abnormal and unstable operational parameters because the wind turbine generator assembly is susceptible to interference or influence from various random uncertain events such as the external environment, signal measurement and transmission, etc. A pneumatic subsystem-related data black box model, a transmission subsystem model, a tower subsystem model, and an electrical subsystem model are simulated individually using the steady-state operational parameters, and then combined to form a dynamic dominant-operation simulation model for simulating an operation process of the wind turbine generator assembly. Meanwhile, a dynamic deviation compensation model is constructed on the basis of the dynamic dominant-operation simulation model to achieve compensation for operational parameters and loaded operational parameters of the dynamic dominant-operation simulation model, thereby establishing a dynamic multi-input multi-output hybrid semi-mechanistic simulation model for dominant operation of the wind turbine generator assembly under all working statuses that is driven by dual sources of mechanism and data, i.e., establishing a digital twin model for the wind turbine generator assembly. In this way, the operation process of the wind turbine generator assembly can be simulated more realistically by establishing each of the submodels, which helps to improve the accuracy of the simulation results.

An embodiment of the present disclosure further proposes a system for simulating a dynamic digital twin model of dominant operation of a wind turbine generator assembly. The simulation system comprises: deploying a digital twin model for a wind turbine generator assembly in software and hardware tools by reference to an operation control strategy for the wind turbine generator assembly to achieve an emulation of an operation process of the wind turbine generator assembly, where the digital twin model is obtained by the simulation method described above.

Here, the software and hardware tools include at least one of a digital emulation server, a master computer, a physical PLC controller, and a Labview development environment. Specifically, an operating state of an actual wind turbine generator assembly is simulated in real time by relying on the digital emulation server to provide relevant operational parameters of the wind turbine generator assembly for estimation of loaded operational parameters. A main control system of the wind turbine generator assembly is built by using a corresponding programming language based on the actual operation control strategy for the wind turbine generator assembly in combination with the PLC controller to receive the real-time operational parameters of the wind turbine generator assembly and at the same time return a control signal, so as to achieve dynamic real-time emulation of the operation of the whole assembly. Designing of a monitoring interface of the master computer and debugging of a communication interface are performed based on a monitoring apparatus of the master computer and the Labview development environment to achieve real-time reading and display of data flow at monitored measurement points during the operation of the assembly. In the whole process, the cross-platform real-time data interaction between the digital emulation server, the PLC main control system, and the monitoring system of the master computer are achieved by an OPC communication protocol.

Here, the digital emulation server is configured to simulate the dynamics of dominant operation of the actual wind turbine generator assembly in real time. The PLC controller is configured to build a main control system of the assembly and to receive model emulation data and at the same time return a control signal. The master computer and the Labview development environment are configured to achieve the real-time display of the data flow at monitored measurement points during operation.

The operation control strategy for the wind turbine generator assembly includes: judgment conditions such as an assembly start-up condition, an assembly shutdown condition, a pitch-varying condition, a yaw condition, etc. The control system of the wind turbine generator assembly is designed based on these conditions in combination with the operation control strategy for the wind turbine generator assembly to create a complete closed-loop system.

Figure 6:
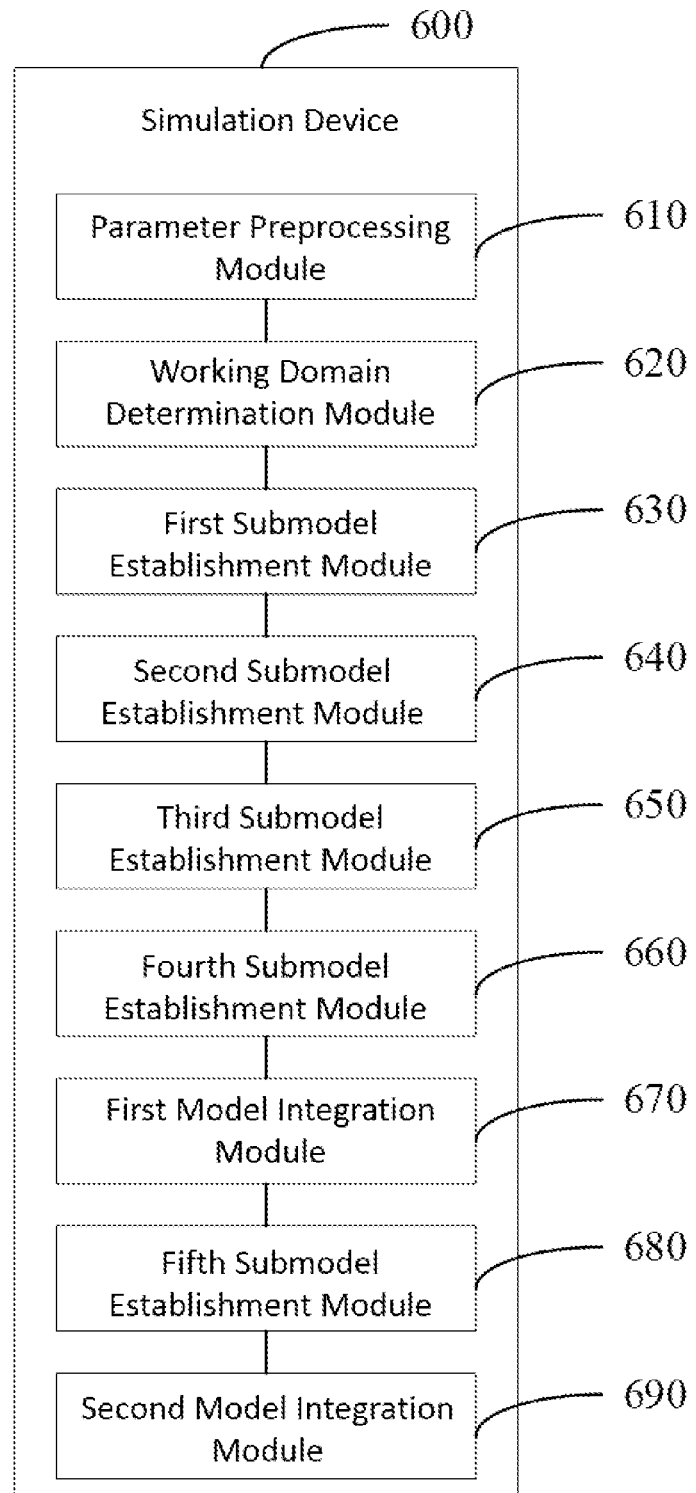
FIG. 6 is a schematic structural diagram of a device for simulating a dynamic digital twin model of dominant operation of a wind turbine generator assembly according to an embodiment of the present disclosure.

Referring to FIG. 6, FIG. 6 is a schematic structural diagram of a device for simulating a dynamic digital twin model of dominant operation of a wind turbine generator assembly according to an embodiment of the present disclosure. As shown in FIG. 6, the simulation device 600 comprises:

a parameter preprocessing module 610 configured to preprocess conventional operational parameters of the wind turbine generator assembly that are acquired in real time, and extract steady-state operational parameters from the conventional operational parameters, wherein the conventional operational parameters are parameters acquired during real-time operation of the wind turbine generator assembly;

a working domain determination module 620 configured to separate the steady-state operational parameters of the wind turbine generator assembly under all working statuses in accordance with a preset working status dividing condition, and determine a plurality of operational working domains involved in the operational parameters of the wind turbine generator assembly at a plurality of operational time points under different task working statuses, wherein the all working statuses include at least a normal power generation status and a power restriction and wind power curtailment status;

a first submodel establishment module 630 configured to establish a pneumatic subsystem-related data black box model by using the steady-state operational parameters of the wind turbine generator assembly at each operational time point included in each operational working domain, wherein the pneumatic subsystem-related data black box model is used for determining a mechanical torque of a wind turbine during working of the wind turbine generator assembly in each operational working domain;

a second submodel establishment module 640 configured to establish a transmission subsystem model by mechanical dynamics of the wind turbine generator assembly reflected, by using the mechanical torque of the wind turbine during working of the wind turbine generator assembly in each operational working domain and hardware structural parameters of the wind turbine generator assembly in combination with a lumped parametric mechanistic model, wherein the transmission subsystem model is used for determining a torque of an intermediate shaft of a gearbox during working of the wind turbine generator assembly in each operational working domain, and the mechanical dynamics are used for reflecting an operating state of each hardware facility of the wind turbine generator assembly;

a third submodel establishment module 650 configured to establish a tower subsystem model by mechanical dynamics of the wind turbine generator assembly reflected, by using tower mass, a damping coefficient, and a stiffness matrix of a tower assembly of the wind turbine generator assembly as well as an axial thrust applied to a tower top of the tower assembly in combination with a lumped parametric mechanistic model, wherein the tower subsystem model is used for determining a vibrational acceleration of the tower top of the tower assembly;

a fourth submodel establishment module 660 configured to establish an electrical subsystem model by using the steady-state operational parameters of the wind turbine generator assembly, an electromagnetic torque reference value, and an equivalent time constant in combination with a data black box model, wherein the electrical subsystem model is used for determining a rate of change in electromagnetic torque of a generator during working of the wind turbine generator assembly;

a first model integration module 670 configured to integrate the pneumatic subsystem-related data black box model, the transmission subsystem model, the tower subsystem model, and the electrical subsystem model, and performing a combined identification of model parameters by using a system identification algorithm to obtain a dynamic dominant-operation simulation model for the wind turbine generator assembly, wherein the dynamic dominant-operation simulation model is used for simulating an operation process of the wind turbine generator assembly;

a fifth submodel establishment module 680 configured to construct a dynamic deviation compensation model on the basis of the dynamic dominant-operation simulation model by using the steady-state operational parameters of the wind turbine generator assembly in combination with a machine learning algorithm, wherein the dynamic deviation compensation model is used for determining a state deviation compensation term and an output deviation compensation term, the state deviation compensation term is used for compensating for operational parameters during operation of the dynamic dominant-operation simulation model, and the output deviation compensation term is used for compensating for loaded operational parameters outputted from the dynamic dominant-operation simulation model; and a second model integration module 690 configured to integrate the dynamic dominant-operation simulation model and the dynamic deviation compensation model to establish a digital twin model for the wind turbine generator assembly.

Further, the steady-state operational parameters are operational parameters having a nonlinear relationship therebetween. When the first submodel establishment module 630 is configured to establish a pneumatic subsystem model by using the steady-state operational parameters of the wind turbine generator assembly at each operational time point included in each operational working domain, the first submodel establishment module 603 is configured to:

establish a pneumatic subsystem model by converting the nonlinear relationship between the steady-state operational parameters at each operational time point into a linear relationship by using a data black box model based on the steady-state operational parameters of the wind turbine generator assembly at each operational time point included in each operational working domain.

Further, when the second submodel establishment module 640 is configured to establish a transmission subsystem model by mechanical dynamics of the wind turbine generator assembly reflected, by using the mechanical torque of the wind turbine during working of the wind turbine generator assembly in each operational working domain and hardware structural parameters of the wind turbine generator assembly in combination with a lumped parametric mechanistic model, the second submodel establishment module 640 is configured to:

select a target parametric model from a plurality of preset lumped parametric mechanistic models using preset mechanistic information; and establish a transmission subsystem model by mechanical dynamics of the wind turbine generator assembly reflected, by using the target parametric model based on the mechanical torque of the wind turbine during working of the wind turbine generator assembly in each operational working domain and hardware structural parameters of the wind turbine generator assembly.

Further, when the parameter preprocessing module 610 is configured to preprocess conventional operational parameters of the wind turbine generator assembly that are acquired in real time, and extract steady-state operational parameters under different task working statuses from the conventional operational parameters, the parameter preprocessing module 610 is configured to:

filter out abnormal operational parameters from the conventional operational parameters by reference to reference values for operational parameters of the wind turbine generator assembly to obtain compliant operational parameters;

preliminarily extract preliminary steady-state parameters from the compliant operational parameters located in a specific window with a preset window length by using a random sampling consensus algorithm; and extract steady-state operational parameters from the preliminary steady-state parameters by fitting the preliminary steady-state parameters using a least-squares fitting algorithm and by means of a data fitted curve obtained by the fitting.

Further, when the working domain determination module 620 is configured to separate the steady-state operational parameters of the wind turbine generator assembly under all working statuses in accordance with a preset working status dividing condition, and determine a plurality of operational working domains involved in the operational parameters of the wind turbine generator assembly at a plurality of operational time points under different task working statuses, the working domain determination module 620 is configured to:

establish a finite difference regressive vector at each operational time point for the wind turbine generator assembly by using the steady-state operational parameters, wherein the finite difference regressive vector comprises the operational parameters and loaded operational parameters of the wind turbine generator assembly at a plurality of operational time points;

divide the finite difference regressive vectors at the plurality of operational time points into a plurality of local datasets by determining a Euclidean distance between the finite difference regressive vector at each operational time point and the finite difference regressive vector at a central time point, wherein the central time point is randomly determined;

determine a local regressive vector of each local dataset with reference to the finite difference regressive vector at each operational time point;

combine the local regressive vector of each local dataset and a vector mean value of each local regressive vector to obtain an assembly feature vector for the wind turbine generator assembly; and determine a plurality of operational working domains involved in the steady-state operational parameters of the wind turbine generator assembly at the plurality of operational time points by performing high-dimensional clustering processing on the assembly feature vectors.

Further, when the working domain determination module 620 is configured to divide the steady-state operational parameters at the plurality of operational time points into a plurality of local datasets by determining a Euclidean distance between the finite difference regressive vector at each operational time point and the finite difference regressive vector at a central time point, the working domain determination module 620 is configured to:

randomly determine a plurality of central time points from a plurality of time points;

calculate, for each central time point, a Euclidean distance between the finite difference regressive vector at each time point and the finite difference regressive vector at the central time point;

determine an operational time point, at which the Euclidean distance is less than a preset distance threshold, as a target time point in a local dataset corresponding to the central time point; and create the local dataset corresponding to the central time point based on the finite difference regressive vector for the wind turbine generator assembly at each target time point.

Further, when the working domain determination module 620 is configured to determine a plurality of operational working domains involved in the operational parameters of the wind turbine generator assembly at the plurality of operational time points by performing high-dimensional clustering processing on the assembly feature vectors, the working domain determination module 620 is configured to:

divide the operational parameters of the wind turbine generator assembly at the plurality of operational time points into a plurality of working domains to be estimated, by performing high-dimensional clustering processing on the assembly feature vectors; and estimate, for each working domain to be estimated, a working domain boundary of the working domain to be estimated by establishing a hyperplane equation for the working domain to be estimated using the operational parameters located at each operational time point in the working domain to be estimated, thereby determining a plurality of operational working domains involved in the operational parameters of the wind turbine generator assembly at the plurality of operational time points.

In the device for simulating a dynamic digital twin model of dominant operation of a wind turbine generator assembly according to an embodiment of the present disclosure, conventional operational parameters of the wind turbine generator assembly that are acquired in real time are preprocessed to obtain steady-state operational parameters of the wind turbine generator assembly, considering that the collected conventional operational parameters contain abnormal and unstable operational parameters because the wind turbine generator assembly is susceptible to interference or influence from various random uncertain events such as the external environment, signal measurement and transmission, etc. A pneumatic subsystem-related data black box model, a transmission subsystem model, a tower subsystem model, and an electrical subsystem model are simulated individually using the steady-state operational parameters, and then combined to form a dynamic dominant-operation simulation model for simulating an operation process of the wind turbine generator assembly. Meanwhile, a dynamic deviation compensation model is constructed on the basis of the dynamic dominant-operation simulation model to achieve compensation for operational parameters and loaded operational parameters of the dynamic dominant-operation simulation model, thereby establishing a dynamic multi-input multi-output hybrid semi-mechanistic simulation model for dominant operation of the wind turbine generator assembly under all working statuses that is driven by dual sources of mechanism and data. In this way, the operation process of the wind turbine generator assembly can be simulated more realistically by establishing each of the submodels, which helps to improve the accuracy of the simulation results.

Figure 7:
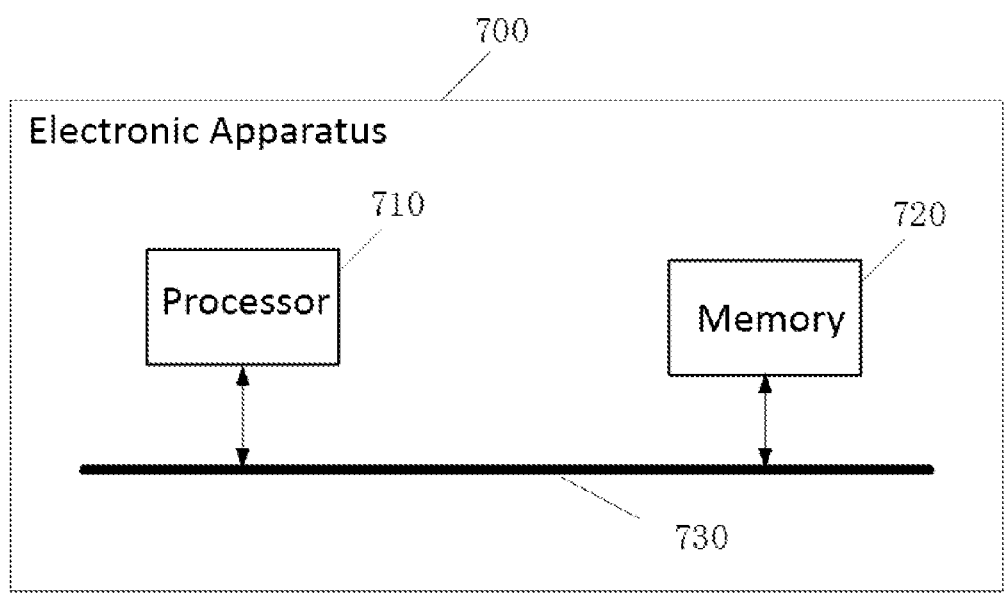
FIG. 7 is a schematic structural diagram of an electronic apparatus according to an embodiment of the present disclosure.

Referring to FIG. 7, FIG. 7 is a schematic structural diagram of an electronic apparatus according to an embodiment of the present disclosure. As shown in FIG. 7, the electronic apparatus 700 comprises a processor 710, a memory 720, and a bus 730.

The memory 720 stores a machine-readable instruction executable by the processor 710. When the electronic apparatus 700 is in operation, the processor 710 communicates with the memory 720 through a bus 730. When the machine-readable instruction is executed by the processor 710, the steps of the method for simulating a dynamic digital twin model of dominant operation of a wind turbine generator assembly in the method embodiment as shown in FIG. 1 above may be executed. The specific implementation mode may be understood with reference to the method embodiment and will not be described repeatedly herein.

An embodiment of the present disclosure further provides a computer-readable storage medium. A computer program is stored on the computer-readable storage medium. The steps of the method for simulating a dynamic digital twin model of dominant operation of a wind turbine generator assembly in the method embodiment as shown in FIG. 1 above may be executed when the computer program is run by a processor. The specific implementation mode may be understood with reference to the method embodiment and will not be described repeatedly herein.

It will be clearly appreciated by those skilled in the art that, for convenience and brevity of the description, specific working processes of the system, device, and units described above may be performed with reference to the corresponding processes in the foregoing method embodiments and will not be described repeatedly herein.

In several embodiments according to the present disclosure, it should be understood that the disclosed system, device, and method may be implemented in other ways. The embodiments of the device described above are merely illustrative in nature. For example, the units are divided only by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed may be implemented via indirect coupling or communication between some communication interfaces, devices, or units, which may be electronic, mechanical, or in other forms.

The units described as separate components may be or not be separated physically. The components illustrated as units may be or not be physical units. In other words, they may be located at one place or they may be distributed onto multiple network units. Some or all of the units may be selected as actually required to fulfill the purposes of the solutions of the present embodiments.

Besides, the individual functional units in the embodiments of the present disclosure may be integrated into one processing unit, or each of the units may be physically stand-alone, or two or more of the units may be integrated into one unit.

When implemented in the form of a software functional module and sold or used as an independent product, the functions may be stored in a nonvolatile computer-readable storage medium executable by a processor. Based on such understanding, a technical solution of the present disclosure essentially, or the part thereof contributing to the prior art, or a part of the technical solution may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that can store program code, such as a USB flash disk, a mobile hard disk, a read-only memory (ROM), a random access memory (RAM), a magnetic disk, an optical disk, or the like.

Finally, it should be noted that the embodiments described above are merely specific embodiments of the present disclosure, which are intended to illustrate the technical solutions of the present disclosure and not intended to limit the present disclosure, and to which the scope of protection of the present disclosure is not limited. Although the present disclosure has been illustrated in detail with reference to the foregoing embodiments, it should be understood by those skilled in the art that the technical solutions described in the foregoing embodiments can be modified, or variations thereof can be readily conceived of, or some of the technical features thereof can be equivalently replaced by those skilled in the art within the technical scope disclosed in the present disclosure. Such modifications, variations, or replacements do not cause the essence of the corresponding technical solutions to depart from the spirit and scope of the technical solutions of the embodiments of the present disclosure, and are therefore intended to be encompassed within the scope of protection of the present disclosure. Therefore, the scope of protection of the present disclosure should be defined by the scope of the appended claims.

What is claimed is:

1. A system for simulating a dynamic digital twin model of dominant operation of a wind turbine generator assembly, the system comprising:
deploying the digital twin model for the wind turbine generator assembly in software and hardware tools by reference to an operation control strategy for the wind turbine generator assembly to achieve an emulation of an operation process of the wind turbine generator assembly, wherein the digital twin model is obtained by a simulation method, wherein the simulation method comprises:
preprocessing conventional operational parameters of the wind turbine generator assembly that are acquired in real time, and extracting steady-state operational parameters from the conventional operational parameters, wherein the conventional operational parameters are parameters acquired during real-time operation of the wind turbine generator assembly;
separating the steady-state operational parameters of the wind turbine generator assembly under all working statuses in accordance with a preset working status dividing condition, and determining a plurality of operational working domains involved in operational parameters of the wind turbine generator assembly at a plurality of operational time points under different task working statuses, wherein the all working statuses comprise at least a normal power generation status and a power restriction and wind power curtailment status;
establishing a pneumatic subsystem-related data black box model by using the steady-state operational parameters of the wind turbine generator assembly at each operational time point comprised in each operational working domain, wherein the pneumatic subsystem-related data black box model is configured for determining a mechanical torque of a wind turbine during working of the wind turbine generator assembly in each operational working domain;
establishing a transmission subsystem model by mechanical dynamics of the wind turbine generator assembly reflected, by using the mechanical torque of the wind turbine during the working of the wind turbine generator assembly in each operational working domain and hardware structural parameters of the wind turbine generator assembly in combination with a lumped parametric mechanistic model, wherein the transmission subsystem model is configured for determining a torque of an intermediate shaft of a gearbox during the working of the wind turbine generator assembly in each operational working domain, and the mechanical dynamics are used for reflecting an operating state of each hardware facility of the wind turbine generator assembly;
establishing a tower subsystem model by mechanical dynamics of the wind turbine generator assembly reflected, by using a tower mass, a damping coefficient, and a stiffness matrix of a tower assembly of the wind turbine generator assembly as well as an axial thrust applied to a tower top of the tower assembly in combination with the lumped parametric mechanistic model, wherein the tower subsystem model is configured for determining a vibrational acceleration of the tower top of the tower assembly;
establishing an electrical subsystem model by using the steady-state operational parameters of the wind turbine generator assembly, an electromagnetic torque reference value, and an equivalent time constant in combination with the data black box model, wherein the electrical subsystem model is configured for determining a rate of change in electromagnetic torque of a generator during working of the wind turbine generator assembly;
integrating the pneumatic subsystem-related data black box model, the transmission subsystem model, the tower subsystem model, and the electrical subsystem model, and performing a combined identification of model parameters by using a system identification algorithm to obtain a dynamic dominant-operation simulation model for the wind turbine generator assembly, wherein the dynamic dominant-operation simulation model is configured for simulating an operation process of the wind turbine generator assembly;

constructing a dynamic deviation compensation model based on the dynamic dominant-operation simulation model by using the steady-state operational parameters of the wind turbine generator assembly in combination with a machine learning algorithm, wherein the dynamic deviation compensation model is configured for determining a state deviation compensation term and an output deviation compensation term, the state deviation compensation term is used for compensating for operational parameters during operation of the dynamic dominant-operation simulation model, and the output deviation compensation term is used for compensating for loaded operational parameters outputted from the dynamic dominant-operation simulation model; and integrating the dynamic dominant-operation simulation model and the dynamic deviation compensation model to establish a digital twin model for the wind turbine generator assembly.

2. The system according to claim 1, wherein the software and hardware tools comprise at least one of a digital emulation server, a master computer, a physical PLC controller, and a Labview development environment.

3. The system according to claim 1, wherein the steady-state operational parameters are operational parameters having a nonlinear relationship therebetween; and the operation of establishing a pneumatic subsystem model by using the steady-state operational parameters of the wind turbine generator assembly at each operational time point comprised in each operational working domain comprises:

establishing a pneumatic subsystem model by converting the nonlinear relationship between the steady-state operational parameters at each operational time point into a linear relationship by using the data black box model based on the steady-state operational parameters of the wind turbine generator assembly at each operational time point comprised in each operational working domain.

4. The system according to claim 1, wherein the operation of establishing a transmission subsystem model by mechanical dynamics of the wind turbine generator assembly reflected, by using the mechanical torque of the wind turbine during the working of the wind turbine generator assembly in each operational working domain and hardware structural parameters of the wind turbine generator assembly in combination with a lumped parametric mechanistic model comprises:

selecting a target parametric model from a plurality of preset lumped parametric mechanistic models using preset mechanistic information; and establishing the transmission subsystem model by the mechanical dynamics of the wind turbine generator assembly reflected, by using the target parametric model based on the mechanical torque of the wind turbine during the working of the wind turbine generator assembly in each operational working domain and the hardware structural parameters of the wind turbine generator assembly.

5. The system according to claim 1, wherein the operation of preprocessing conventional operational parameters of the wind turbine generator assembly that are acquired in real time, and extracting steady-state operational parameters under different task working statuses from the conventional operational parameters comprises:

filtering out abnormal operational parameters from the conventional operational parameters by reference to reference values for operational parameters of the wind turbine generator assembly to obtain compliant operational parameters;

preliminarily extracting preliminary steady-state parameters from the compliant operational parameters located in a specific window with a preset window length by using a random sampling consensus algorithm; and extracting the steady-state operational parameters from the preliminary steady-state parameters by fitting the preliminary steady-state parameters using a least-squares fitting algorithm and by a data fitted curve obtained by the fitting.

6. The system according to claim 1, wherein the operation of separating the steady-state operational parameters of the wind turbine generator assembly under all working statuses in accordance with a preset working status dividing condition, and determining a plurality of operational working domains involved in operational parameters of the wind turbine generator assembly at a plurality of operational time points under different task working statuses comprises:

establishing a finite difference regressive vector at each operational time point for the wind turbine generator assembly by using the steady-state operational parameters, wherein the finite difference regressive vector comprises the operational parameters and loaded operational parameters of the wind turbine generator assembly at the plurality of operational time points;

dividing finite difference regressive vectors at the plurality of operational time points into a plurality of local datasets by determining a Euclidean distance between a finite difference regressive vector at each operational time point and a finite difference regressive vector at a central time point, wherein the central time point is randomly determined;

determining a local regressive vector of each local dataset with reference to the finite difference regressive vector at each operational time point;

combining the local regressive vector of each local dataset and a vector mean value of each local regressive vector to obtain an assembly feature vector for the wind turbine generator assembly; and determining the plurality of operational working domains involved in the steady-state operational parameters of the wind turbine generator assembly at the plurality of operational time points by performing high-dimensional clustering processing on the assembly feature vector.

7. The system according to claim 6, wherein the operation of dividing the steady-state operational parameters at the plurality of operational time points into a plurality of local datasets by determining a Euclidean distance between a finite difference regressive vector at each operational time point and a finite difference regressive vector at a central time point comprises:

randomly determining a plurality of central time points from a plurality of time points;

calculating, for each central time point, a Euclidean distance between a finite difference regressive vector at each time point and a finite difference regressive vector at the central time point;

determining an operational time point, at which the Euclidean distance is less than a preset distance threshold, as a target time point in a local dataset corresponding to the central time point; and creating the local dataset corresponding to the central time point based on a finite difference regressive vector for the wind turbine generator assembly at each target time point.

8. The system according to claim 6, wherein the operation of determining the plurality of operational working domains involved in the operational parameters of the wind turbine generator assembly at the plurality of operational time points by performing high-dimensional clustering processing on the assembly feature vector comprises:

dividing the operational parameters of the wind turbine generator assembly at the plurality of operational time points into a plurality of working domains to be estimated, by performing the high-dimensional clustering processing on the assembly feature vector; and estimating, for each working domain to be estimated, a working domain boundary of the working domain to be estimated by establishing a hyperplane equation for the working domain to be estimated using operational parameters located at each operational time point in the working domain to be estimated, so as to determine the plurality of operational working domains involved in the operational parameters of the wind turbine generator assembly at the plurality of operational time points.

9. A device for simulating a dynamic digital twin model of dominant operation of a wind turbine generator assembly, the device comprising:

one or more processors;

a memory storing instructions; and a bus configured to connect the one or more processors and the memory;

wherein when the instructions are executed by the one or more processors, the device performs operations comprising:

deploying the digital twin model for the wind turbine generator assembly in software and hardware tools by reference to an operation control strategy for the wind turbine generator assembly to achieve an emulation of an operation process of the wind turbine generator assembly, wherein the digital twin model is obtained by a simulation method, wherein the simulation method comprises:

preprocessing conventional operational parameters of the wind turbine generator assembly that are acquired in real time, and extracting steady-state operational parameters from the conventional operational parameters, wherein the conventional operational parameters are parameters acquired during real-time operation of the wind turbine generator assembly;

separating the steady-state operational parameters of the wind turbine generator assembly under all working statuses in accordance with a preset working status dividing condition, and determining a plurality of operational working domains involved in operational parameters of the wind turbine generator assembly at a plurality of operational time points under different task working statuses, wherein the all working statuses comprise at least a normal power generation status and a power restriction and wind power curtailment status;

establishing a pneumatic subsystem-related data black box model by using the steady-state operational parameters of the wind turbine generator assembly at each operational time point comprised in each operational working domain, wherein the pneumatic subsystem-related data black box model is configured for determining a mechanical torque of a wind turbine during working of the wind turbine generator assembly in each operational working domain;

establishing a transmission subsystem model by mechanical dynamics of the wind turbine generator assembly reflected, by using the mechanical torque of the wind turbine during the working of the wind turbine generator assembly in each operational working domain and hardware structural parameters of the wind turbine generator assembly in combination with a lumped parametric mechanistic model, wherein the transmission subsystem model is configured for determining a torque of an intermediate shaft of a gearbox during the working of the wind turbine generator assembly in each operational working domain, and the mechanical dynamics are used for reflecting an operating state of each hardware facility of the wind turbine generator assembly;

establishing a tower subsystem model by mechanical dynamics of the wind turbine generator assembly reflected, by using a tower mass, a damping coefficient, and a stiffness matrix of a tower assembly of the wind turbine generator assembly as well as an axial thrust applied to a tower top of the tower assembly in combination with the lumped parametric mechanistic model, wherein the tower subsystem model is configured for determining a vibrational acceleration of the tower top of the tower assembly;

establishing an electrical subsystem model by using the steady-state operational parameters of the wind turbine generator assembly, an electromagnetic torque reference value, and an equivalent time constant in combination with the data black box model, wherein the electrical subsystem model is configured for determining a rate of change in electromagnetic torque of a generator during working of the wind turbine generator assembly;

integrating the pneumatic subsystem-related data black box model, the transmission subsystem model, the tower subsystem model, and the electrical subsystem model, and performing a combined identification of model parameters by using a system identification algorithm to obtain a dynamic dominant-operation simulation model for the wind turbine generator assembly, wherein the dynamic dominant-operation simulation model is configured for simulating an operation process of the wind turbine generator assembly;

constructing a dynamic deviation compensation model based on the dynamic dominant-operation simulation model by using the steady-state operational parameters of the wind turbine generator assembly in combination with a machine learning algorithm, wherein the dynamic deviation compensation model is configured for determining a state deviation compensation term and an output deviation compensation term, the state deviation compensation term is used for compensating for operational parameters during operation of the dynamic dominant-operation simulation model, and the output deviation compensation term is used for compensating for loaded operational parameters outputted from the dynamic dominant-operation simulation model; and integrating the dynamic dominant-operation simulation model and the dynamic deviation compensation model to establish a digital twin model for the wind turbine generator assembly.

\* \* \* \* \*